United States Patent
Scherpbier et al.

(10) Patent No.: US 10,389,657 B1
(45) Date of Patent: *Aug. 20, 2019

(54) SYSTEM AND METHOD FOR VOICE TRANSMISSION OVER NETWORK PROTOCOLS

(71) Applicant: OPEN INVENTION NETWORK, LLC, Durham, NC (US)

(72) Inventors: Andrew W. Scherpbier, San Diego, CA (US); Mark Randle Boyns, Alpine, CA (US)

(73) Assignee: OPEN INVENTION NETWORK, LLC., Durham, NC (US)

( * ) Notice: Subject to any disclaimer, the term of this patent is extended or adjusted under 35 U.S.C. 154(b) by 259 days.

This patent is subject to a terminal disclaimer.

(21) Appl. No.: 14/049,358

(22) Filed: Oct. 9, 2013

Related U.S. Application Data

(63) Continuation of application No. 13/368,979, filed on Feb. 8, 2012, now Pat. No. 8,559,469, which is a continuation of application No. 12/893,747, filed on Sep. 29, 2010, now Pat. No. 8,135,045, which is a continuation of application No. 11/750,259, filed on May 17, 2007, now Pat. No. 7,830,866, which is a continuation of application No. 10/624,721, filed on Jul. 21, 2003, now Pat. No. 7,236,926, which is a continuation of application No. 09/434,619, filed on Nov. 5, 1999, now Pat. No. 6,621,834.

(51) Int. Cl.
*H04L 12/861* (2013.01)
*G10L 19/012* (2013.01)

(52) U.S. Cl.
CPC ............ *H04L 49/90* (2013.01); *G10L 19/012* (2013.01)

(58) Field of Classification Search
CPC .............................. H04L 49/90; G10L 19/012
USPC ......................................................... 370/252
See application file for complete search history.

(56) References Cited

U.S. PATENT DOCUMENTS

| | | | | |
|---|---|---|---|---|
| 5,276,765 A | * | 1/1994 | Freeman | G10L 25/78 704/233 |
| 5,673,394 A | * | 9/1997 | Fenwick | G06F 12/0866 709/213 |
| 5,905,871 A | * | 5/1999 | Buskens | H04L 12/185 709/238 |
| 5,978,756 A | * | 11/1999 | Walker | G10L 19/012 704/206 |
| 6,031,915 A | * | 2/2000 | Okano et al. | 381/56 |
| 6,049,765 A | * | 4/2000 | Iyengar et al. | 704/201 |

(Continued)

*Primary Examiner* — Stephen J Clawson

(57) ABSTRACT

A system and method for voice transmission over high level network protocols. On the Internet and the World Wide Web, such high level protocols are HTTP/TCP. The restrictions imposed by firewalls and proxy servers are avoided by using HTTP level connections to transmit voice data. In addition, packet delivery guarantees are obtained by using TCP instead of UDP. Variable compression based on silence detection takes advantage of the natural silences and pauses in human speech, thus reducing the delays in transmission caused by using HTTP/TCP. The silence detection includes the ability to bookend the voice data sent with small portions of silence to insure that the voice sounds natural. Finally, the voice data is transmitted to each client computer independently from a common circular list of voice data, thus insuring that all clients will stay current with the most recent voice data.

12 Claims, 4 Drawing Sheets

(56) References Cited

U.S. PATENT DOCUMENTS

| | | | |
|---|---|---|---|
| 6,138,152 A * | 10/2000 | Jalote | G06F 17/30887 |
| | | | 707/999.202 |
| 6,167,033 A * | 12/2000 | Chang | H04L 12/1827 |
| | | | 370/241 |
| 6,304,574 B1 * | 10/2001 | Schoo et al. | 370/401 |
| 2001/0014857 A1 * | 8/2001 | Wang | 704/231 |
| 2002/0064169 A1 * | 5/2002 | Gummalla et al. | 370/412 |

* cited by examiner

SYSTEM AND METHOD FOR VOICE TRANSMISSION OVER NETWORK PROTOCOLS

CROSS-REFERENCE TO RELATED APPLICATIONS

The instant application is a continuation of and claims priority from patent application Ser. No. 13/368,979, filed Feb. 8, 2012, entitled SYSTEM AND METHOD FOR VOICE TRANSMISSION OVER NETWORK PROTOCOLS, now issued U.S. Pat. No. 8,559,469, issued on Oct. 15, 2013, which is a continuation of patent application Ser. No. 12/893,747, filed Sep. 29, 2010, entitled SYSTEM AND METHOD FOR VOICE TRANSMISSION OVER NETWORK PROTOCOLS, now issued U.S. Pat. No. 8,135,045, issued on Mar. 13, 2012, which is a continuation of patent application Ser. No. 11/750,259, filed May 17, 2007, entitled SYSTEM AND METHOD FOR VOICE TRANSMISSION OVER NETWORK PROTOCOLS, now issued U.S. Pat. No. 7,830,866, issued on Nov. 9, 2010, which is a continuation of patent application Ser. No. 10/624,721, filed Jul. 21, 2003, entitled SYSTEM AND METHOD FOR VOICE TRANSMISSION OVER NETWORK PROTOCOLS, now issued U.S. Pat. No. 7,236,926, issued on Jun. 26, 2007, which is a continuation of patent application Ser. No. 09/434,619, filed on Nov. 5, 1999, entitled SYSTEM AND METHOD FOR VOICE TRANSMISSION OVER NETWORK PROTOCOLS, now issued U.S. Pat. No. 6,621,834, issued on Sep. 16, 2003, the entire contents of which each are incorporated by reference herein.

BACKGROUND OF THE INVENTION

1. Field of the Invention

The present invention relates generally to systems and methods for transmitting voice data over computer networks such as the Internet and the World Wide Web ("Web"), and more particularly to systems and methods for enabling voice transmission over high level Internet protocols, such as those used by web browsers and web servers.

2. Related Art

This application hereby incorporates, in its entirety, U.S. Pat. No. 5,944,791 ("the '791 patent"), issued on Aug. 31, 1999 to Andrew W. Scherpbier. The '791 patent provides a system and method for allowing a first computer, or "pilot computer", to direct the web browsing experience of one or more second computers, or "passenger computers". The pilot computer controls what web pages are displayed on the passenger computers. The system and method performs this function without requiring modifications to the web browsers of the passenger computers. In addition, the '791 patent discloses how to allow multiple pilot computers to simultaneously direct the same web browsing session. Thus the '791 patent creates a collaborative web browsing session.

Such collaborative web browsing sessions can be highly useful on computer networks. They allow a company, government agency, or even an individual, to conduct a conference for a widely Such collaborative web browsing sessions can be highly useful on computer networks. They allow a company, government agency, or even an individual, to conduct a conference for a widely dispersed audience. Such conferences can be a simple slide presentation similar to a Powerpoint presentation, or they can be more detailed, and include the vast versatility of the Web.

However, in addition to the visual presentation, it is desirable to include an audio presentation as well. This is true not only for collaborative web browsing sessions, but also for any other network conferencing system requiring real-time interactivity. To accommodate this need, standard phone lines have been used to fulfill this audio requirement. While these sorts of conference calls can be easily accomplished for small groups, the difficulties of establishing such conference calls for large groups over standard phone lines can be extreme. These difficulties become even greater when some desired presenters or audience members for the conference are located overseas.

In addition to standard phone lines, computer networks, such as the Internet, have also been used to support an audio presentation. The problem is that traditional methods for transmitting audio over computer networks introduce unpredictable delays in the audio broadcast. Such delays are unacceptable for collaborative web browsing sessions and network conferencing systems in general, which must be coordinated and highly interactive. Thus, traditional methods of providing audio cannot be used with collaborative web browsing systems, or any other systems requiring real-time interactivity.

Examples of traditional network based methods of providing conference audio include Microsoft's Net Meeting, Netscape's Conference, Internet Conference Professional, and CU-See Me. These types of traditional Internet audio broadcasting methods typically add ten to sixty seconds of latency to an audio stream so that any network problems can be smoothed out.

In addition to these latency problems, these systems are undesirable because their audio signals can be blocked by firewalls, proxy servers and the like. Firewalls and proxy servers may block traditional Internet audio broadcasts because they typically use UDP/IP (User Datagram Protocol/Internet Protocol) to send audio data. Because UDP has no control of multiple related packets, it is difficult to proxy UDP streams and firewalls tend to block them.

In an attempt to overcome these problems, traditional Internet audio broadcasting software is typically designed for specific types of computer architectures and is then installed on each customer's computer system. These machine-specific software products will typically use UDP/IP to send voice data. UDP provides faster transmission times over the Internet at the expense of the delivery guarantees of TCP. The locally installed software solves the delivery problems by buffering, for example, ten to twenty seconds worth of data, thus allowing the client time to reorder mixed up packets, request re-transmission of lost packets and ignore duplicate packets. In addition, as already mentioned, because UDP has no control of multiple related packets, it is difficult to proxy UDP streams and firewalls tend to block them. Thus, providers of traditional audio broadcasting systems also sell system-specific plug-ins to the firewalls and proxy servers to solve the transmission restrictions common to computer systems of the highly sought Fortune 1000 customers.

This system has at least three major drawbacks. First, it requires the installation of machine specific software to overcome restrictions imposed by firewalls and proxy servers, and the use of UDP. This is something that many companies would prefer not to do. Most consumers of Internet conferencing services would prefer to keep their company firewalls and proxy servers in tact, and avoid unnecessary modifications.

Second, because this system relies on locally installed software, it requires that the audio broadcasting software be able to fall back to the slower HTTP/TCP/IP to allow complete access to the conference over the Internet. This network protocol adds significant overhead to transmission times. With the traditional streaming audio signal, any network congestion will create cumulative delays which are significant. This limits the ability of the Internet conference to be interactive, which is a fundamental requirement of Internet conferencing.

Finally, even when the software is only using UDP/IP, there is still a major delay in voice transmission, typically at least ten seconds. This delay becomes worse with network congestion. Because presentations using Internet conferencing are interactive, excessive delay, or latency, from when a presenter says a word to when an audience member actually hears it, is unacceptable to most consumers of Internet conferencing services.

Therefore, what is needed is a system and method for providing voice data transmission over computer networks, such as the Internet, which minimizes transmission delays, bypasses firewalls and proxy servers, and avoids the installation of machine specific software.

SUMMARY OF THE INVENTION

The present invention is directed toward a system and method for transmitting voice data over high level networking protocols, such as HTTP/TCP/IP.

A feature of the present invention is that it uses HTTP as its primary protocol to transmit voice data over the Internet. In this fashion, it cuts through firewalls and proxy servers used by many potential consumers of Internet conferencing services. It does this seamlessly, without installation of system-specific software. Preferably, the only requirement is a standard Java-enabled web browser and the temporary installation of a small Java client, which is done automatically by the web browser without user intervention. Additionally, because the present invention relies on TCP instead of UDP to transmit voice data, it has automatic guaranteed delivery of packets. This eliminates the need for a large buffer on the client computer to store incoming voice data, and thereby removes a source of fixed latency found in conventional systems.

Another feature of the present invention is that it utilizes variable compression based on silence detection. This silence detection is performed at a fine scale. By taking advantage of the natural silences and pauses in human speech, the present invention minimizes the amount of voice data that must be transmitted over the network. In so doing, it more than compensates for the transmission overhead added by using HTTP/TCP/IP, and thus significantly reduces delays in transmission. Therefore, this feature of the present invention enables a truly interactive Internet conference.

In addition, according to one aspect of the present invention, the non-silence portions of voice data are bookended with small silent frames. This is done to insure that the threshold detection mechanism employed during silence detection does not cut off the small beginning and ending sounds of each segment of non-silence. In this fashion, the voice data that is transmitted is not improperly truncated. Without this aspect of the invention, the voice of the speaker may sound unnatural.

Another feature of the present invention is that it transmits voice data to each client computer independently, with a data structure that forces each client computer to stay current with the conference. This avoids the cumulative delays that can be caused by network traffic. It does this by not transmitting voice data that has become too old and irrelevant. If a particular client computer experiences local network problems, it will not affect the data received by other client computers, nor will it force the delayed client computer to receive stale voice data. Thus, this feature of the present invention insures that each client stays current with the conference.

DETAILED DESCRIPTION OF THE INVENTION

1. Introduction and Overview

Figure 1:
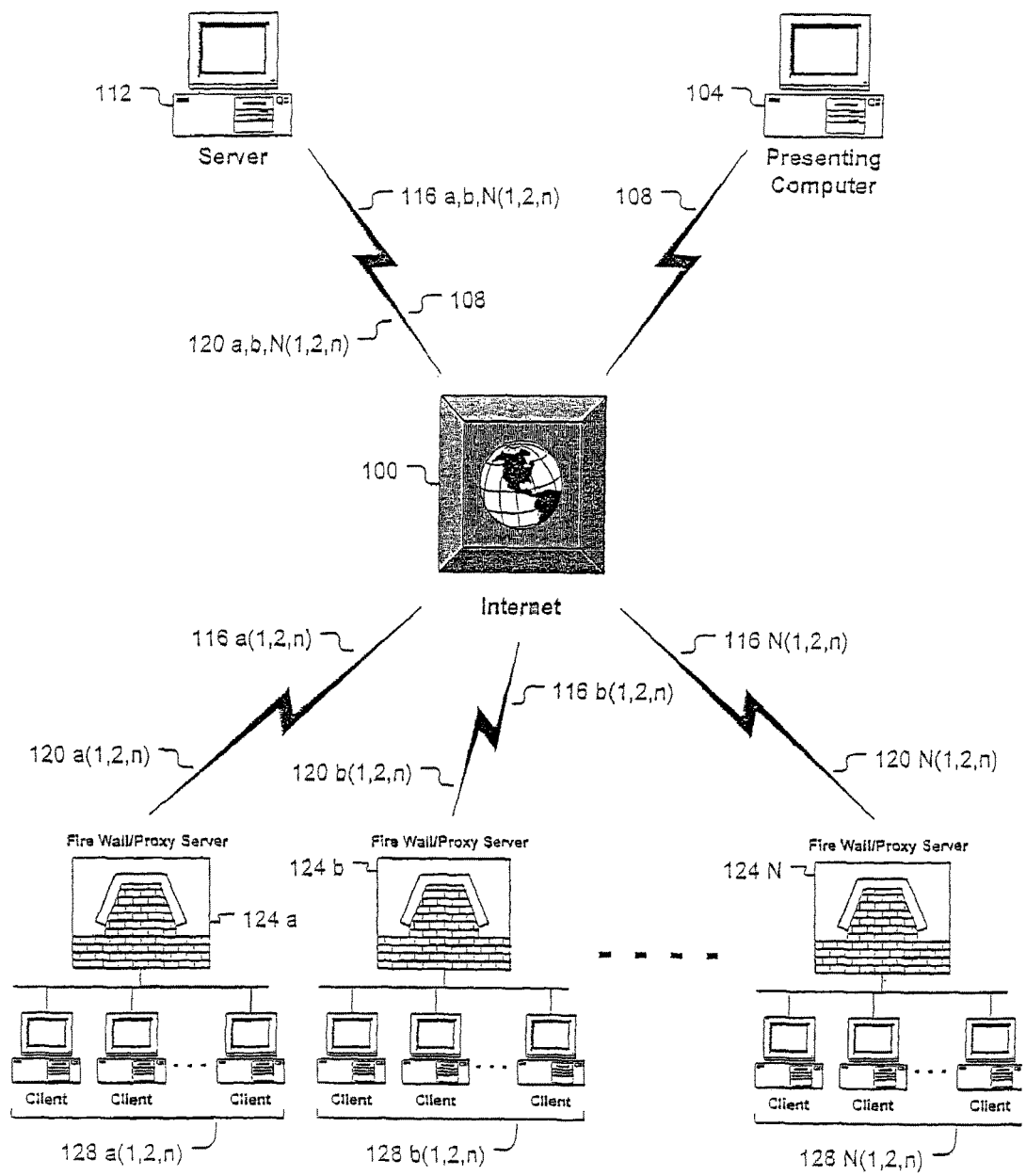
FIG. 1 is a block diagram depicting an example operational environment according to a preferred embodiment of the present invention.

The present invention is directed toward a system and method for transmitting voice data over high level networking protocols, such as HTTP/TCP. By using HTTP/TCP as the transmitting protocol, the present invention can be used to transmit voice data through firewalls and proxy servers. At the same time, the present invention allows a truly interactive Internet conferencing experience.

The present invention is disclosed and described herein in terms of a single presenter on a single presenting computer utilizing the Internet and the World Wide Web. However, after reading this description it will become apparent to one of ordinary skill in the art how to implement the invention in alternative embodiments and alternative network environments. For example, alternative embodiments would include multiple presenters on multiple presenting computers, and alternative network environments would include a private company's own intranet or LAN. As such, the description of this example embodiment should not be construed to limit the scope and breadth of the present invention.

2. Example Environment

The Internet, which originally came about in the late 1960s, is a computer network made up of many smaller networks spanning the entire globe. The host computers or networks of computers on the Internet allow public access to on-line services and information. Hosts can be sponsored by a wide range of entities including, for example, universities, government organizations, commercial enterprises and individuals. Internet information and services are made available to the public through servers running on an Internet host.

Networking protocols can be used to facilitate communications between the host and a requesting client. TCP/IP is one such networking protocol. Computers on a TCP/IP network utilize unique ID codes, allowing each computer or host on the Internet to be uniquely identified. Such codes can include an IP number or address, and corresponding network and computer names.

Created in 1991, the World-Wide Web provides access to information on the Internet, allowing a user to navigate Internet resources intuitively, without IP addresses or other specialized knowledge. The Web comprises millions of interconnected "pages", or documents, which can be displayed on a user's computer monitor. The web pages are provided by hosts running servers. Web server software is relatively simple and available on a wide range of computer platforms, including standard personal computers. Equally available is web browser software, used to request and display web pages and other types of files.

The Web is based on the concept of hypertext and a transfer method known as HTTP, which is designed to run primarily over TCP/IP. HTTP uses the standard Internet setup, where a server issues the data and a client displays or processes it using a web browser. This data can be in many forms including text, pictures and sound.

Java is an interpreted programming language created by Sun Microsystems, Inc., and designed specifically with network programming in mind. All that is required to run a Java program is a piece of software called a virtual machine. The virtual machine interprets and executes the Java code as it is received. Thus the power of Java is that it is platform independent and makes network programming easy. In addition, Java has security measures built into it, thus reducing the risks of computer viruses. It is well accepted that Java is an excellent language for the Web.

The growth of the Web has been exponential in recent years. Many businesses, especially Fortune 1000 companies, now have their internal computer networks connected to the Internet and have their own web sites. In so doing, these companies not only provide information about themselves to the public, but they provide their employees with access to the vast resources of the Internet. In addition, they frequently offer their products for sale over the Web.

However, connecting to the Internet comes with risks. For example, once connected to the Internet, a company's internal computer systems are accessible to hackers. To combat these risks, most large companies use firewalls and/or proxy servers. A firewall is a software filter that limits access to the company's intranet from the outside and limits company employee's access to the Internet from the inside. A proxy server is a piece of software used in combination with a firewall to allow network traffic to cross the firewall under tight control. Due to the wide use of firewalls and proxy servers by large companies, any Internet conferencing service should find a way to overcome the restrictions imposed by them.

The invention is described herein in terms of this example network environment. Description in these terms is provided for ease of discussion only. After reading the description herein, it will become apparent to one of ordinary skill in the art that the present invention can be implemented in any of a number of alternative embodiments and alternative network environments. As such, the description of this example embodiment should not be construed to limit the scope and breadth of the present invention.

3. Voice Transmission Over Network Protocols

Having thus described an example environment for the invention, the invention is now described in detail in terms of this example environment, and according to one or more embodiments. FIG. 1 is a block diagram depicting an example operational environment according to a preferred embodiment of the present invention. In this example operational environment, the network being utilized is the Internet 100. Coupled to each other through the Internet 100 are a presenting computer 104, a server 112, and one or more client computers ("clients") 128 $a$(1) through 128 N(n). The presenting computer 104 establishes and maintains an open HTTP connection 108 with the server 112 through the Internet 100. At the presenting computer 104, is a speaker (not shown) who provides audio input. From this input voice buffers are created in the manner depicted in FIG. 2 and described below. These voice buffers are transmitted to the server 112 via the open HTTP connection 108.

In an alternative embodiment, the presenting computer 104 and the server 108 may be one and the same. For example, a speaker could call into the server 112 on a regular phone line and provide the audio input directly to the server 112. In this example, the server 112 would process this audio input to generate voice buffers in the same manner that the presenting computer 104 does in a preferred embodiment described herein.

In another related alternative embodiment, there may be multiple speakers connected via a phone bridge to either the presenting computer 104 or the server 112. Their merged conversation would then be transformed into voice buffers either at a presenting computer 104 as described herein, or at the server 112 as described in the preceding alternative embodiment.

Figure 2:
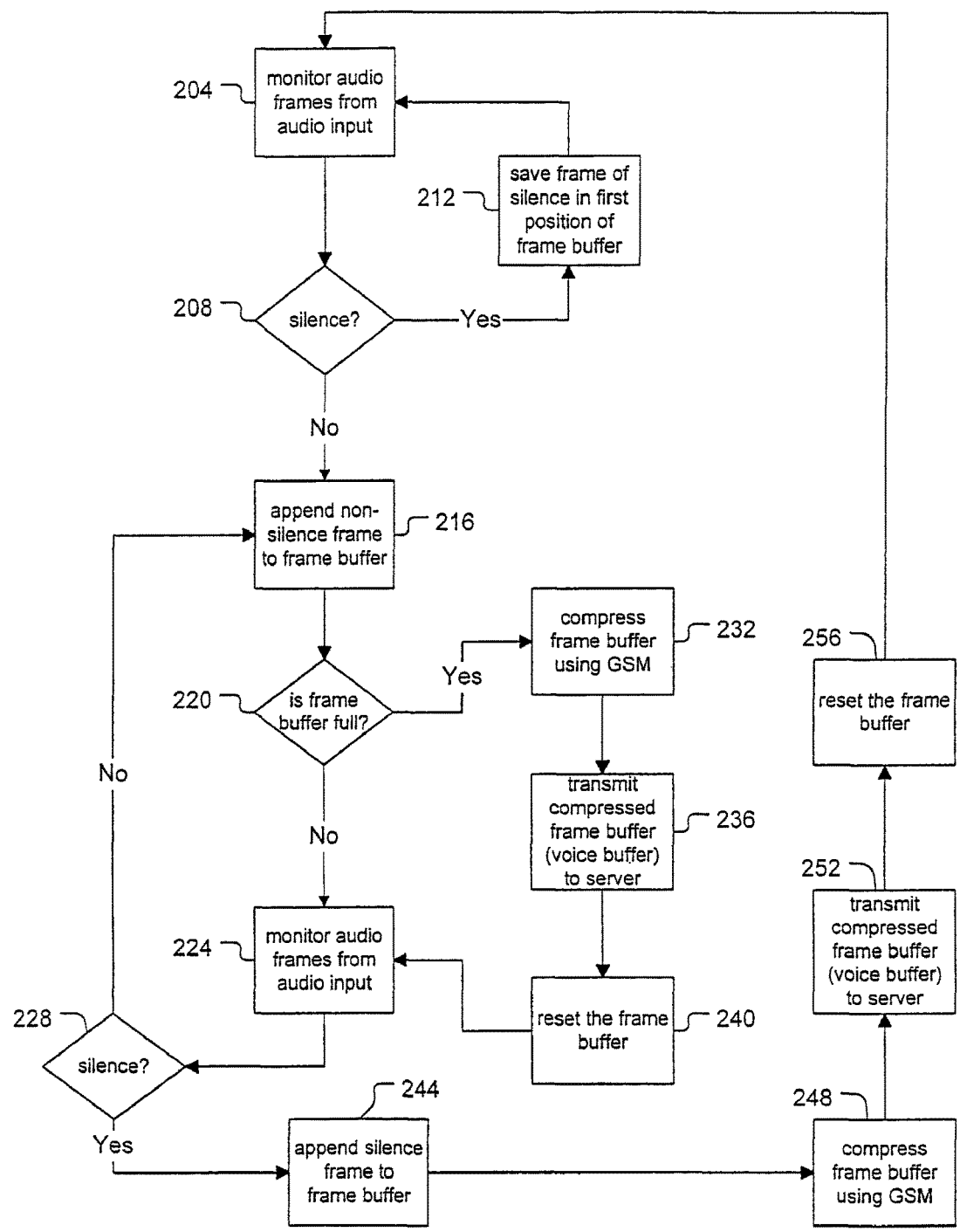
FIG. 2 is a flow chart depicting a method that can be used in the presenting computer for creating voice buffers for transmission to the client computers.

In yet a third alternative embodiment, there may be multiple presenting computers 104 sending voice buffers to the server 112 through multiple open HTTP connections 108. In this alternative embodiment the server 112 would merge the voice buffers before sending them out to the client computers 128. The multiple presenting computers would create voice buffers in the same manner as depicted in FIG. 2 and described herein, or alternatively, the presenting computers would have a slightly modified process for creating voice buffers as described in detail in the subsequent description of FIG. 2.

In addition, in a preferred embodiment, the open H FIT connections 108 and 116 are implemented using a custom protocol built on top of HTTP. This custom protocol adds extra information to the standard HTTP protocol to facilitate the interactions of the presenting computer 104, the server 112 and the client computers 128. For example, the server 112 sends the voice data to the client computers 128 using a message format that includes command, subcommand, and status information, in addition to a list of name-value pairs. The command and subcommand fields are used to determine the action to perform, and the status field is used for relevant status information as needed. The name-value pairs are used as arguments, or parameters, to the action defined by the command and subcommand fields.

For example, a voice message containing voice data to be played can consist of a command "voice", a subcommand "play", and a name-value pair of "data", where data contains the voice data sent as voice buffers. The use of this custom protocol, in a preferred embodiment, enables the transmission of more than just voice data over the open HTTP connections 108 and 116. One skilled in the relevant art(s) would understand how to design and implement such a custom protocol given the disclosure provided herein.

Still referring to FIG. 1, the server 112 receives, via the Internet 100, one or more HTTP requests 120 $a$(1) through 120 N(n) from the client computers 128 $a$(1) through 128 N(n) to be connected to the Internet conference. For each such request 120, the server 112 establishes and maintains an open HTTP connection 116. This is done by downloading a small Java client which allows the HTTP connection 116 with the server 112 to be kept open. Because these open connections 116 utilize HTTP as their transfer protocol, the data transmitted via the Internet 100 to the client computers 128 passes through the firewalls and proxy servers 124 a through 124 N with ease. The only requirement, in this example, is a Java-enabled web browser on each client computer 128. In this fashion, the voice data is distributed to all the clients 128 who wish to join the Internet conference.

It should be noted that the present invention also allows each client computer 128 to become its own presenting computer 104. Thus one embodiment of the present invention would be a conference expander, allowing any number of individuals to be attendees of one conference and simultaneously be presenters for their own subconference.

FIG. 2 is a flow chart depicting a method that can be used in the presenting computer 104 for creating voice buffers for transmission to the client computers 128. The process begins with step 204, where the presenting computer 104 monitors the incoming audio data in discrete frames. In a preferred embodiment, these frames are of short duration, such as one-tenth of a second. For each of these frames, a determination is made in step 208 as to whether that frame is silence or non-silence.

This determination is made based on a threshold which is dependant on the particular speaker providing the audio data. This threshold is preferably determined prior to the beginning of the Internet conference. In one embodiment, this threshold could be determined by measuring the average energy of a speaker's sample audio data over a fixed interval, and calculating a predetermined fraction of that energy. If the frame is determined to be silence, it is saved in the first position of a frame buffer in step 212. Steps 204 through 212 are repeated until a non-silence frame is found. In an alternative embodiment of the present invention, the step 212 would save more than just one prior silent frame. The number of non-silent frames saved will be determined by what is needed to insure that the transmitted voice data sounds natural to the human ear. In one embodiment, the number of silent frames are adjusted to a particular speaker in a manner similar to the threshold.

Step 228 determines if the audio frame is silence. If so, control passes to step 244 where the silent frame is appended to the frame buffer. In an alternative embodiment of the present invention, step 244 appends more than just one silent frame to the frame buffer. The number of non-silent frames to be appended is determined by what is needed to insure that the transmitted voice data sounds natural to the human ear. In this alternative embodiment, step 244 would be expanded to include steps similar to steps 216 through 240. From the description and diagrams provided herein, this expansion would be obvious to one skilled in the relevant art.

In step 248, the frame buffer is compressed using GSM. As stated, although a preferred embodiment uses the GSM 06.10 standard for compression, alternative embodiments may use other compression schemes, or no compression scheme. In addition, in an alternative embodiment, such as the third alternative embodiment described in the discussion of FIG. 1, the presenting computers 104 may use no compression scheme whatsoever, relying instead on the server 112 to perform any necessary compression after the merging of the frame buffers. Once the frame buffer has been compressed in step 248, it is transmitted to the server in step 252. This compressed frame buffer, received by the server 112, is the voice buffer referred to by FIG. 3 below and in the description of FIG. 1 above. In step 256, the frame buffer is reset and the process returns to step 204 to monitor the audio frames.

Figure 3:
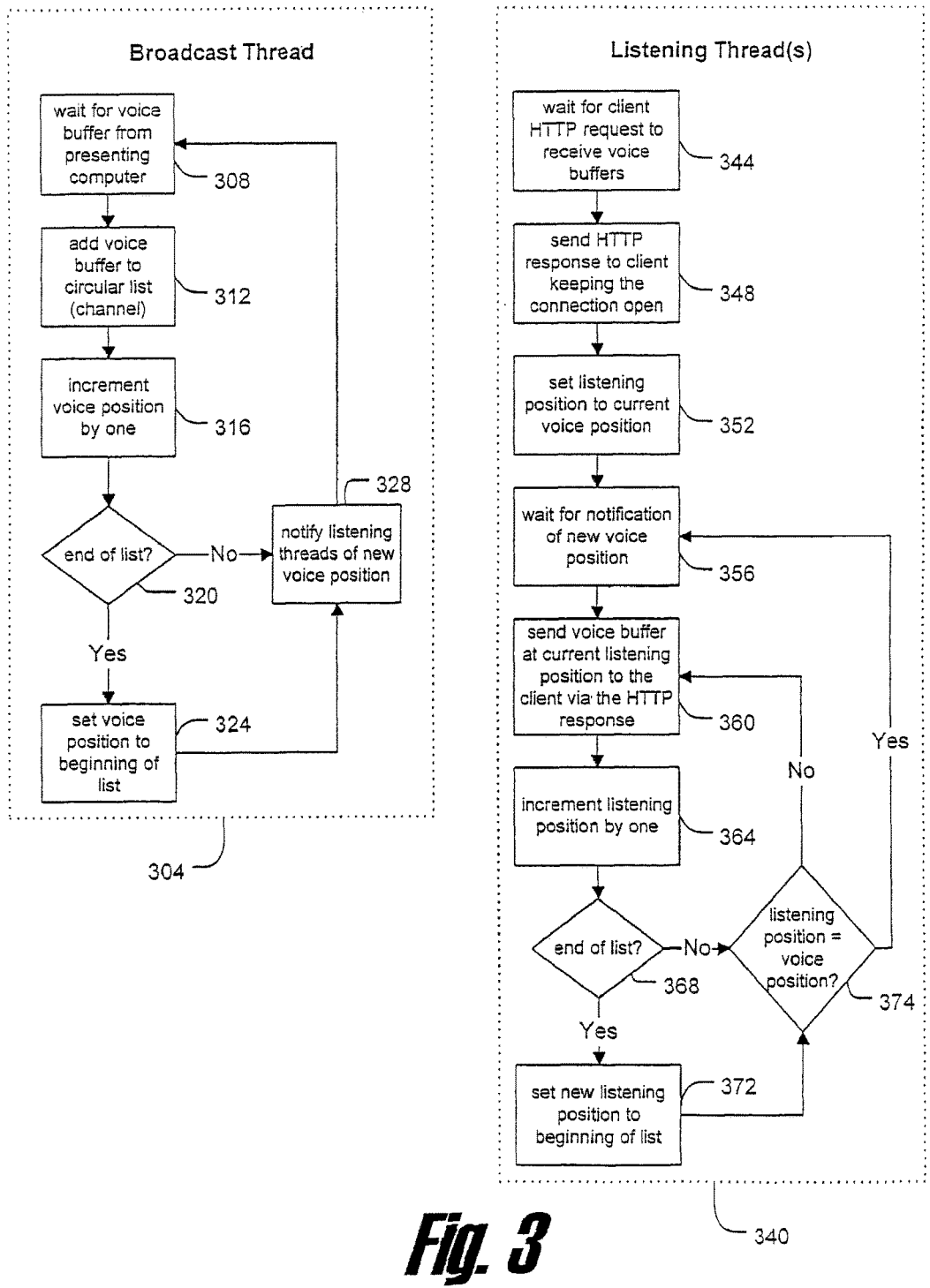
FIG. 3 is a flow chart depicting one example of multiple process threads that can be used by the server to transmit the voice buffers to the client computers.

FIG. 3 is a flow chart depicting one example of multiple process threads that can be used by the server 112 to transmit the voice buffers to the client computers 128. Referring now to FIG. 3, the server 112 has one broadcast thread 304 and one or more listening threads 340, one for each client computer 128. In addition, in an alternative embodiment, such as the first alternative embodiment mentioned in the discussion of FIG. 1, the server 112 may also run an additional thread which performs the process depicted in FIG. 2 and described herein. In this alternative embodiment, the presenting computer 104 and the server 112 are essentially the same device, running multiple processes simultaneously.

The broadcast thread 304 begins with step 308 in which the server 112 waits for a voice buffer from the presenting computer 104. When a new voice buffer is received, it is added to a circular list in step 312. A voice position pointer is then incremented in step 316 so that it will always point to the storage location for the next voice buffer.

To maintain the circular list, the voice position is tested in step 320 to see if it has reached the end of the list. If it has, the voice position is set to the beginning of the circular list in step 324 before the process moves on to step 328. In step 328, broadcast thread 304 notifies the listening threads 340 of the new voice position. Finally, the process moves back to step 308, and repeats.

Each listening thread 340 is initiated in step 344 by an HTTP request 120 from a client computer 128. In step 348, once such a request is received, a new listening thread 340 is created and sends a response to the client computer 128 establishing an open HTTP connection 116 with the client computer 128. The new listening position is set to the current voice position in step 352, and the new listening thread 340 then waits for notification of a new voice position in step 356.

Once a notification of a new voice position is received, the listening thread 340 sends the voice buffer at the current listening position to the client computer 128 via the open HTTP connection 116 in step 360. In a preferred embodiment, the voice buffers have no synchronization data associated with them. The voice buffers are sent out to the client computers 128 by the listening thread 340 in step 360 as soon as possible, and thus each client computer 128 receives the voice data as soon as it is available. Alternative embodiments may include synchronization data with the voice buffers. Such alternative embodiments will still minimize the delay between when a speaker speaks and when the attendees, at the client computers 128, hear.

Subsequent to step 360, in step 364, the listening position is incremented by one. If the listening position is determined to be at the end of the circular list in step 368, then the listening position is set to the beginning of the list in step 372, before the process moves on to step 374. In step 374, the listening position is compared with the voice position. While the listening position does not equal the voice position, the process goes back to step 360 and repeats. Once the listening position is equal to the voice position in step 374, the process goes back to step 356.

In this fashion, each listening thread 340 is kept current with the broadcast thread 304. In a preferred embodiment, the circular list of voice buffers contains only enough slots to store ten seconds worth of voice data on average. However, in alternative embodiments this is adjusted in accordance with the needs of each specific Internet conference.

Although this implementation of the present invention can, on occasion, lead to a client computer 128 not receiving one full round of the circular list voice data, due to local network problems, this is the desired result, and is a feature of the present invention. Due to the nature of an Internet conference, it is more important to keep the client computers 128 up to date with the speaker than to insure that every last bit of voice data gets through.

Figure 4:
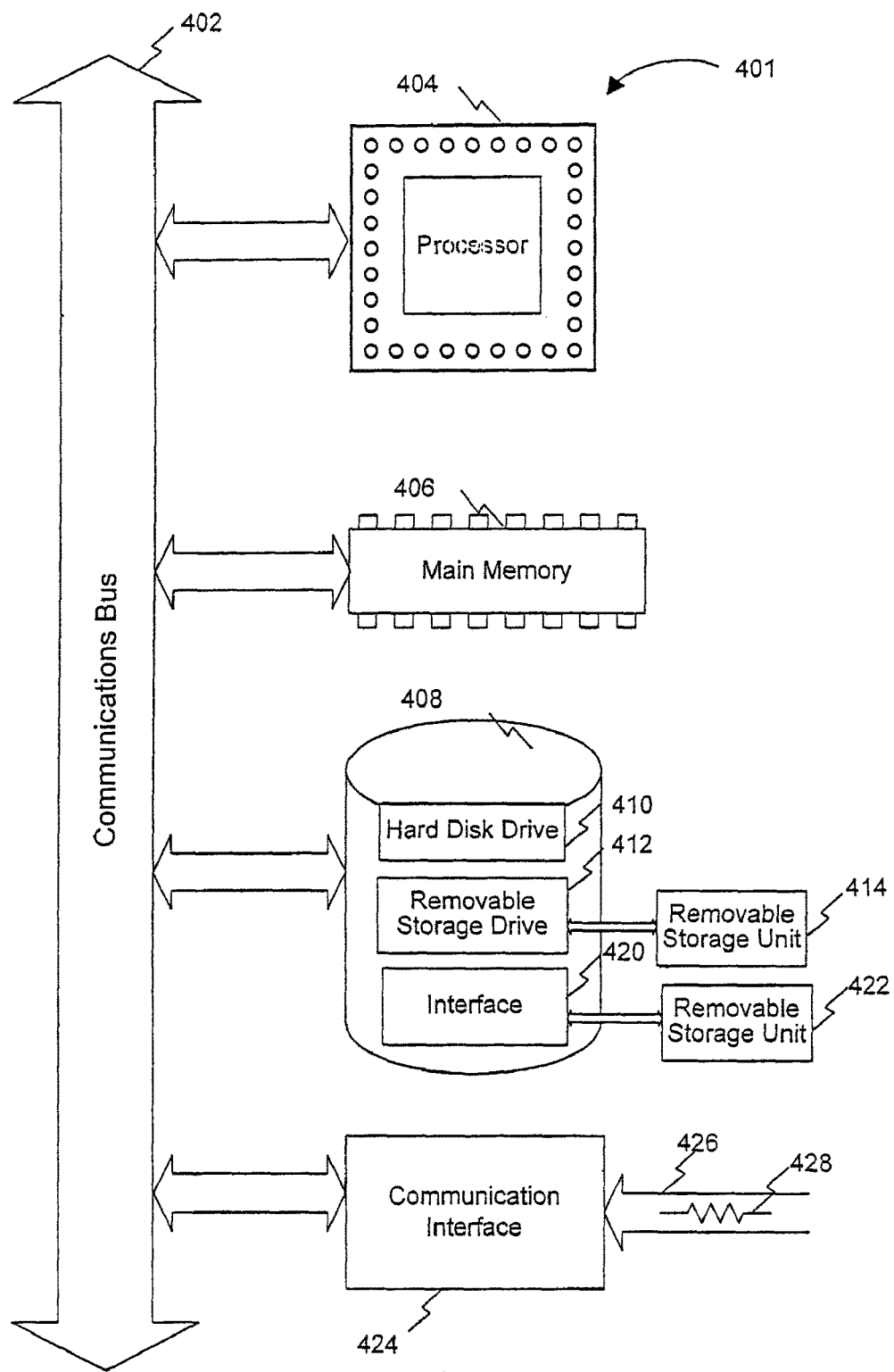
FIG. 4 is a block diagram illustrating an example computer system in which elements and functionality of the invention are implemented according to one embodiment of the invention.

The present invention may be implemented using hardware, software or a combination thereof and may be implemented in a computer system or other processing system. In fact, in one embodiment, the invention is directed toward a computer system capable of carrying out the functionality described herein. An example computer system 401 is shown in FIG. 4. The computer system 401 includes one or more processors, such as processor 404. The processor 404 is connected to a communication bus 402. Various software embodiments are described in terms of this example computer system. After reading this description, it will become apparent to a person skilled in the relevant art(s) how to implement the invention using other computer systems and/or computer architectures.

Computer system 401 also includes a main memory 406, preferably random access memory (RAM), and can also include a secondary memory 408. The secondary memory 408 can include, for example, a hard disk drive 410 and/or a removable storage drive 412, representing a floppy disk drive, a magnetic tape drive, an optical disk drive, etc. The removable storage drive 412 reads from and/or writes to a removable storage unit 414 in a well-known manner. Removable storage unit 414, represents a floppy disk, magnetic tape, optical disk, etc. which is read by and written to by removable storage drive 412. As will be appreciated, the removable storage unit 414 includes a computer usable storage medium having stored therein computer software and/or data.

In alternative embodiments, secondary memory 408 may include other similar means for allowing computer programs or other instructions to be loaded into computer system 401. Such means can include, for example, a removable storage unit 422 and an interface 420. Examples of such can include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 401.

Computer system 401 can also include a communications interface 424. Communications interface 424 allows software and data to be transferred between computer system 401 and external devices. Examples of communications interface 424 can include a modem, a network interface (such as an Ethernet card), a communications port, a PCM-CIA slot and card, etc. Software and data transferred via communications interface 424 are in the form of signals which can be electronic, electromagnetic, optical or other signals capable of being received by communications interface 424. These signals 428 are provided to communications interface via a channel 426. This channel 426 carries signals 428 and can be implemented using wire or cable, fiber optics, a phone line, a cellular phone link, an RF link and other communications channels.

In this document, the terms "computer program medium" and "computer usable medium" are used to generally refer to media such as removable storage drive 412, a hard disk installed in hard disk drive 410, and signals 428. These computer program products are means for providing software to computer system 401.

Computer programs (also called computer control logic) are stored in main memory 406 and/or secondary memory 408. Computer programs can also be received via communications interface 424. Such computer programs, when executed, enable the computer system 401 to perform the features of the present invention as discussed herein. In particular, the computer programs, when executed, enable the processor 404 to perform the features of the present invention. Accordingly, such computer programs represent controllers of the computer system 401.

In an embodiment where the invention is implemented using software, the software may be stored in a computer program product and loaded into computer system 401 using hard drive 410, removable storage drive 412, interface 420 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. In addition, while the particular VOICE TRANSMISSION METHOD herein shown and described in detail is fully capable of attaining the above described objects of this invention, it is to be understood that the description and drawings are the presently preferred embodiment of the invention and are thus representative of the subject matter which is broadly contemplated by the present invention.

Furthermore, the breadth and scope of the present invention fully encompasses other embodiments that may become obvious to those skilled in the art, and thus the breadth and scope of the present invention is accordingly limited by nothing other than the appended claims.

What is claimed is:

1. A method, comprising:
receiving audio data as a plurality of frames by a computer, the audio data being based on an individual human speaker's voice sound;
measuring energy of the audio data for the individual speaker over a fixed interval;
determining an average energy level over the fixed interval;
determining a threshold based on the average energy level by calculating a predetermined fraction of the average energy level;
monitoring the plurality of frames to distinguish between the periods of voice sound and the periods of voice silence of the individual human speaker by applying the threshold to the plurality of frames;
storing at least one voice silence frame of the plurality of frames in a first position of a frame buffer used to store the plurality of frames;
appending at least one voice sound frame to the frame buffer;
appending a plurality of additional frames to the frame buffer used to store the plurality of frames when the frame buffer is not full, wherein a number of the plurality of additional frames appended to the frame buffer is determined based on whether voice silence is detected;

compressing the frame buffer; and transmitting the compressed frame buffer to a server permitting members of a conference to access the voice sound of the audio data.

2. The method of claim 1, wherein said storing includes storing the audio data in the frame buffer having a predetermined size.

3. The method of claim 2, comprising transmitting the stored audio data to one or more client computers, wherein said transmitting comprises at least one of:

observing a data structure to identify when one or more new buffers have been saved; and sending each of the one or more new buffers to one or more client computers;

wherein said transmitting occurs whenever said monitoring detects a period of silence or whenever the frame buffer is full.

4. The method of claim 3, wherein said transmitting is performed using a separate listening thread for each of the client computers.

5. The method of claim 3, wherein the data structure is a circular list having a predetermined size.

6. The method of claim 3, wherein said sending is performed via an open HTTP connection to each of the client computers.

7. The method of claim 3, wherein said storing comprises at least one of:

maintaining a small portion of audio data associated with the periods of silence just before the periods of sound;

first-recording said small portion of audio data along with, and preceding, the audio data associated with the periods of sound, in the frame buffer having a predetermined size; and second-recording a small portion of audio data associated with periods of silence that occur after the audio data associated with the periods of sound, at the end of said frame buffer.

8. The method of claim 7, wherein the transmitting occurs whenever said monitoring detects a period of silence longer than either of said small portions, or whenever said frame buffer is full.

9. The method of claim 3, wherein said transmitting comprises:

observing the data structure to identify when the one or more new buffers have been saved; and sending each of the new buffers to the client computers.

10. The method of claim 3, wherein said transmitting is performed by at least one listening thread for each of the client computers.

11. A non-transitory computer readable medium comprising instructions that when read by a processor perform:

receiving audio data as a plurality of frames by a computer, the audio data being based on an individual human speaker's voice sound;

measuring energy of the audio data over a fixed interval;

determining an average energy level for the individual speaker over the fixed interval;

determining a threshold based on the average energy level by calculating a predetermined fraction of the average energy level;

monitoring the plurality of frames to distinguish between the periods of voice sound and the periods of voice silence of the individual human speaker by applying the threshold to the plurality of frames;

storing at least one voice silence frame of the plurality of frames in a first position of a frame buffer used to store the plurality of frames;

appending at least one voice sound frame to the frame buffer;

appending a plurality of additional frames to the frame buffer used to store the plurality of frames when the frame buffer is not full, wherein a number of the plurality of additional frames appended to the frame buffer is determined based on whether voice silence is detected;

compressing the frame buffer; and transmitting the compressed frame buffer to a server permitting members of a conference to access the voice sound of the audio data.

12. A system for transmitting audio data, comprising:

a processor;

a software agent operated by the processor configured to:

receive audio data as a plurality of frames, the audio data being based on an individual human speaker's voice sound;

measure energy of the audio data over a fixed interval;

determine an average energy level for the individual speaker over the fixed interval;

determine a threshold based on the average energy level based on a calculation of a predetermined fraction of the average energy level;

monitor the plurality of frames to distinguish between the periods of voice sound and the periods of voice silence of the individual human speaker by application of the threshold to the plurality of frames;

store at least one voice silence frame of the plurality of frames in a first position of a frame buffer used to store the plurality of frames;

append at least one voice sound frame to the frame buffer; and append a plurality of additional frames to the frame buffer used to store the plurality of frames when the frame buffer is not full, wherein a number of the plurality of additional frames appended to the frame buffer is determined based on whether voice silence is detected;

compress the frame buffer; and transmit the compressed frame buffer to a server which permits members of a conference to access the voice sound of the audio data.

* * * * *